(12) United States Patent
Reid

(10) Patent No.: US 9,793,068 B2
(45) Date of Patent: Oct. 17, 2017

(54) TRIP INDICATION USING ADJACENT CIRCUIT BREAKERS

(71) Applicant: SCHNEIDER ELECTRIC USA, INC., Palatine, IL (US)

(72) Inventor: Paul A. Reid, Cedar Rapids, IA (US)

(73) Assignee: Schneider Electric USA, Inc., Andover, MA (US)

( * ) Notice: Subject to any disclaimer, the term of this patent is extended or adjusted under 35 U.S.C. 154(b) by 174 days.

(21) Appl. No.: 14/881,746

(22) Filed: Oct. 13, 2015

(65) Prior Publication Data

US 2017/0103861 A1    Apr. 13, 2017

(51) Int. Cl.
| | |
|---|---|
| *H02B 13/00* | (2006.01) |
| *H01H 9/16* | (2006.01) |
| *H02B 1/015* | (2006.01) |
| *H01H 9/02* | (2006.01) |

(52) U.S. Cl.
CPC ............. *H01H 9/161* (2013.01); *H01H 9/02* (2013.01); *H02B 1/015* (2013.01); *H01H 2219/014* (2013.01)

(58) Field of Classification Search
None
See application file for complete search history.

(56) References Cited

U.S. PATENT DOCUMENTS

| 4,468,714 A * | 8/1984 | Russell | H02H 7/30 324/424 |
|---|---|---|---|
| 4,996,646 A * | 2/1991 | Farrington | H02H 3/00 307/132 E |
| 8,521,454 B2 * | 8/2013 | Lagree | H02H 7/30 361/63 |
| 8,570,179 B2 * | 10/2013 | Holloway | F16P 3/14 340/539.22 |

(Continued)

FOREIGN PATENT DOCUMENTS

| DE | 29800372 U1 | 4/1998 |
|---|---|---|
| DE | 102007047477 | 4/2009 |

(Continued)

OTHER PUBLICATIONS

English Language Machine Translation of German Patent No. DE29800372U1 dated Apr. 2, 1998, 8 pages.

(Continued)

*Primary Examiner* — Courtney Smith
(74) *Attorney, Agent, or Firm* — Locke Lord LLP

(57) ABSTRACT

An indicator system for an electronic miniature circuit breaker that has tripped and therefore has no power to provide its own trip indication comprises a breaker in a tripping state and an adjacent breaker in a nontripping state, both with aligned indicator light tubes and data transmission lines or light pipes. The tripped, or tripping, breaker sends a Notice of Trip Data signal before its contacts open and its power goes out, or does so on reserve power. A neighboring breaker's transceiver receives the Notice of Trip Data signal, (Continued)

encodes it, and then repeats it back via an LED and indicator light tube to the tripped breaker. The trip occurrence has opened a shutter on the tripped breaker which allows it to display the repeated Notice of Trip Data signal as a visible light indication through an indicator window in its top wall.

15 Claims, 4 Drawing Sheets

(56) References Cited

U.S. PATENT DOCUMENTS

| | | | | |
|---|---|---|---|---|
| 8,773,827 B2* | 7/2014 | Kiko | | H02J 3/14 |
| | | | | 361/2 |
| 9,379,537 B2* | 6/2016 | Hulse | | H02H 7/262 |
| 9,488,714 B2* | 11/2016 | Dougherty | | H02H 3/006 |
| 2012/0316805 A1* | 12/2012 | Lagree | | H02H 7/30 |
| | | | | 702/58 |
| 2014/0278179 A1* | 9/2014 | Dougherty | | H02H 3/006 |
| | | | | 702/85 |
| 2015/0028848 A1* | 1/2015 | Lynch | | G01R 21/00 |
| | | | | 324/76.11 |
| 2015/0162157 A1* | 6/2015 | Luebke | | H02J 3/14 |
| | | | | 307/140 |
| 2015/0316593 A1* | 11/2015 | Oda | | G01R 19/2513 |
| | | | | 702/60 |
| 2016/0118783 A1* | 4/2016 | Gemme | | H01H 83/20 |
| | | | | 361/42 |

FOREIGN PATENT DOCUMENTS

| | | |
|---|---|---|
| DE | 102012021341 | 4/2014 |
| FR | 2804546 | 8/2001 |
| GB | GB2395361 | 5/2004 |
| WO | WO2015047269 | 4/2015 |

OTHER PUBLICATIONS

English Language Machine Translation of German Patent No. DE102007047477 dated Apr. 23, 2009, 13 pages.
English Language Machine Translation of German Patent No. DE102012021341 dated Apr. 30, 2014, 20 pages.
English Language Machine Translation of French Patent No. FR2804546 dated Aug. 3, 2001, 14 pages.
Extended European Search Report for EP Application No. 16189967.9 dated Mar. 14, 2017, 6 pages.

* cited by examiner

TRIP INDICATION USING ADJACENT CIRCUIT BREAKERS

BACKGROUND

Field of the Invention

The present invention relates to circuit breakers in a panelboards capable of optically communicating trip information to a neighboring breaker which repeats the trip information signal back to the tripped breaker which then displays the trip information on its face.

Discussion of the Related Art

With the rise of functionality for miniature circuit breakers, there is a desire for more data concerning branch circuits to be available at the load center. Important types of information may indentify which breaker has tripped inside the load center and the type of electrical fault which caused a breaker to trip. However, it is common for electronic miniature circuit breakers to be powered from the line side only when the main contacts are closed. This creates an issue for supplying the user with an indication as to why the circuit breaker tripped, since power is removed from the electronics once the main contacts separate.

Accordingly, several schemes have been advanced for supplying such data from the tripped circuit breaker. However, past schemes have been burdened with complexities in implementing such a system.

SUMMARY

The system of the present invention operates by allowing communication directly between an electronic circuit breaker and its neighbors. As is typical, the circuit breakers in a panel are mounted such that there is a neighboring circuit breaker facing at least one of its left and right side walls. Each circuit breaker of the present invention incorporates an optical communications interface that is aligned with an identical optical communications interfaces, i.e. optical port, on a neighboring circuit breaker. Data is allowed to be passed from the tripped, or tripping, breaker to the powered neighboring breaker and then repeated through the optical interfaces back to the tripped breaker and displayed at a visible indicator on its face. Since communication means between the circuit breakers are self-contained within the breakers, the circuit breakers are installed and operated without the need for any additional connections, panel modifications, or changes to the circuit breaker installation procedure.

According to some aspects of the present invention, the complexity of the system is minimized by containing the communications means within the load center entirely within the circuit breakers. Thus, because the improvements of the present system are centered around the improvements to the circuit breaker devices themselves, aspects of the present invention may be suitable for retro-fit applications using existing panel boards already installed in the field.

According to some aspects of the present invention, an indicator system is provided for an electronic miniature circuit breaker that has tripped and therefore has no power to provide its own trip indication which comprises a breaker in a tripping state and a neighboring (adjacent) breaker in a nontripping state, with both breakers having aligned indicator light tubes and data transmission lines. The tripped, or tripping, breaker sends a 'Notice of Trip Data' signal before its contacts open and its power goes out or may do so relying on reserve power such as a capacitor. The neighboring, i.e. untripped, breaker has a data transceiver which receives the Notice of Trip Data signal, encodes it, and then repeats it back via a visible light source through its outbound visible light tube on the same side of the breaker. The trip occurrence has opened a mechanical shutter on the tripped breaker which allows it to display the repeated Notice of Trip Data signal through its top wall (also known as the breaker "face") through a visible indicator window.

According to some aspects of the invention, an electronic circuit breaker with a case, separable electrical contacts, and electronic sensing/data apparatus, has: a data transceiver having a data input side for receiving a neighboring Notice of Trip Data signal and a data output side for outputting a self-Notice of Trip Data signal; a visible light emitter connected to the data transceiver to output a received neighboring Notice of Trip Data signal as a trip indication comprising visible light; electronics for encoding and reporting a self-Notice of Trip Data signal to the data transceiver; visible light indicator windows on the top wall of the breaker; a shutter for the visible light indicator windows, the shutter capable of blocking the visible light indicator windows when the trip indication comprising visible light is output from inside the breaker, and unblocking the visible light indicator windows when the breaker is tripped; left and right side indicator light tubes, each bidirectional light tube being capable for receiving a trip indication comprising visible light from a neighboring breaker (shutter open when in the tripped position) and for transmitting a trip indication comprising visible light to a neighboring breaker from inside the breaker (shutter closed); left and right side light ports in the case, each light port being a light passage through the breaker case leading to an indicator light tube, left and right side bidirectional data lines for receiving notice, i.e. a Notice of Trip Data signal, of a neighboring breaker's trip, i.e. from a neighboring breaker, and for transmitting notice of a self-trip to a neighboring breaker; and each bidirectional data line being connected to the data transceiver.

In other aspects of the present invention a load center can comprise a plurality of electronic circuit breakers of the above type, each breaker being placed in alignment with an adjacent breaker and at least two of the circuit breakers being placed side by side with aligned optical ports, wherein a first circuit breaker's transceiver receives it neighbors' Notice of Trip Data signal on a data line and transmits the neighbors' Notice of Trip Data signal via visible LEDs through the indicator light tube(s) and aligned optical ports.

BRIEF DESCRIPTION OF THE DRAWINGS

The foregoing and other advantages of the disclosed embodiments will become apparent upon reading the following detailed description and upon reference to the exemplary drawings according to one or more embodiments disclosed herein, wherein.

DETAILED DESCRIPTION OF THE DISCLOSED EMBODIMENTS

As an initial matter, it will be appreciated that the development of an actual, real commercial application incorporating aspects of the disclosed embodiments will require many implementation specific decisions to achieve the developer's ultimate goal for the commercial embodiment. Such implementation specific decisions may include, and likely are not limited to, compliance with system related, business related, government related and other constraints, which may vary by specific implementation, location and from time to time. While a developer's efforts might be complex and time consuming in an absolute sense, such efforts would nevertheless be a routine undertaking for those of skill in this art having the benefit of this disclosure.

It should also be understood that the embodiments disclosed and taught herein are susceptible to numerous and various modifications and alternative forms. Thus, the use of a singular term, such as, but not limited to, "a" and the like, is not intended as limiting of the number of items. Similarly, any relational terms, such as, but not limited to, "top," "bottom," "left," "right," "upper," "lower," "down," "up," "side," and the like, used in the written description are for clarity in specific reference to the drawings and are not intended to limit the scope of the invention.

Figure 1:
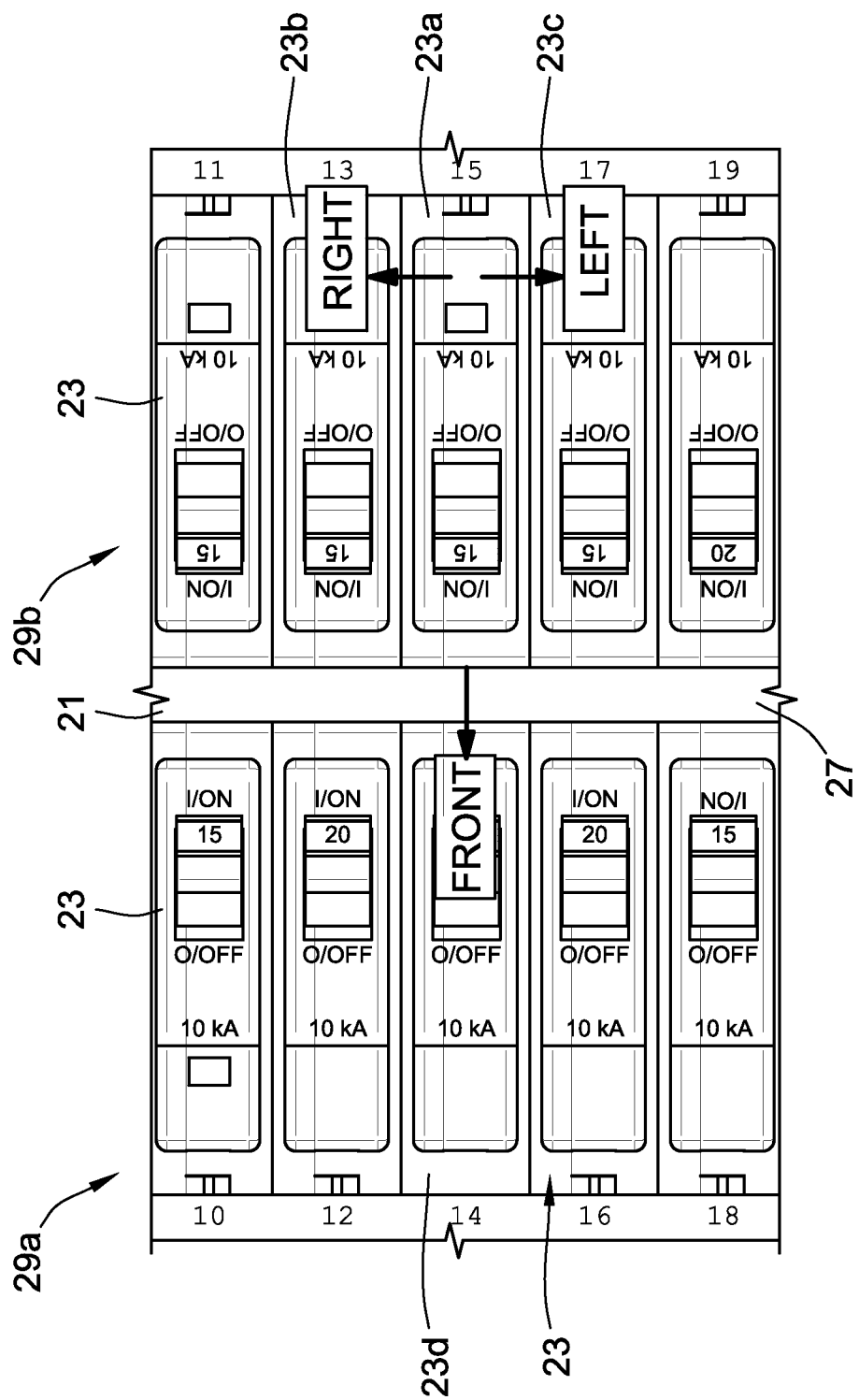
FIG. 1 is a front view of a load center panel populated with electronic miniature circuit breakers.

By studying the drawings, and with particular reference to FIG. 1, persons of ordinary skill in the art will understand that they are looking at a panel board represented by a load center 21 having an enclosure represented by faceplate 27 and with its individual slot positions populated by miniature circuit breakers (sometimes referred to just as "breakers") collectively 23. The breakers 23 are shown arranged in two closely spaced columns 29a, 29b but could also be arrange in a single column or row. In such an arrangement, it will noted that most breakers, such as an exemplary circuit breaker 23a, having neighboring breakers to the right 23b, left 23c, and front 23d sides of the subject breaker 23a. While illustrated and described in the context of residential load centers, it will be understood the present invention is applicable to commercial and industrial load centers and panel boards, OEM circuit breaker panel applications, and any enclosure containing multiple circuit breakers.

Figure 2B:
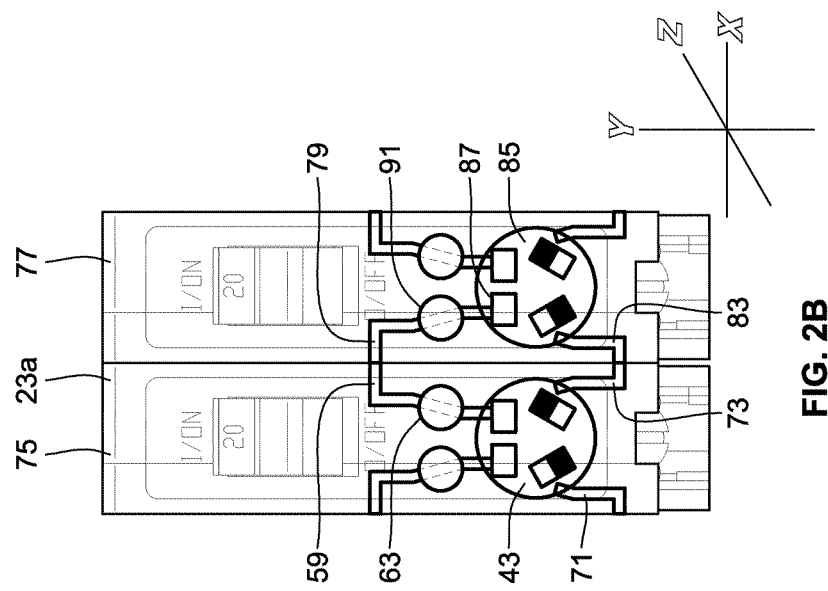
FIG. 2A is a front view of an exemplary breaker and FIG. 2B is a front view of two exemplary breakers side by side.
Figure 2A:
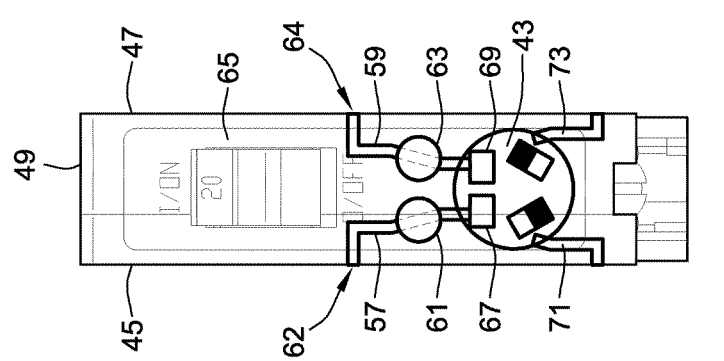
Figure 4:
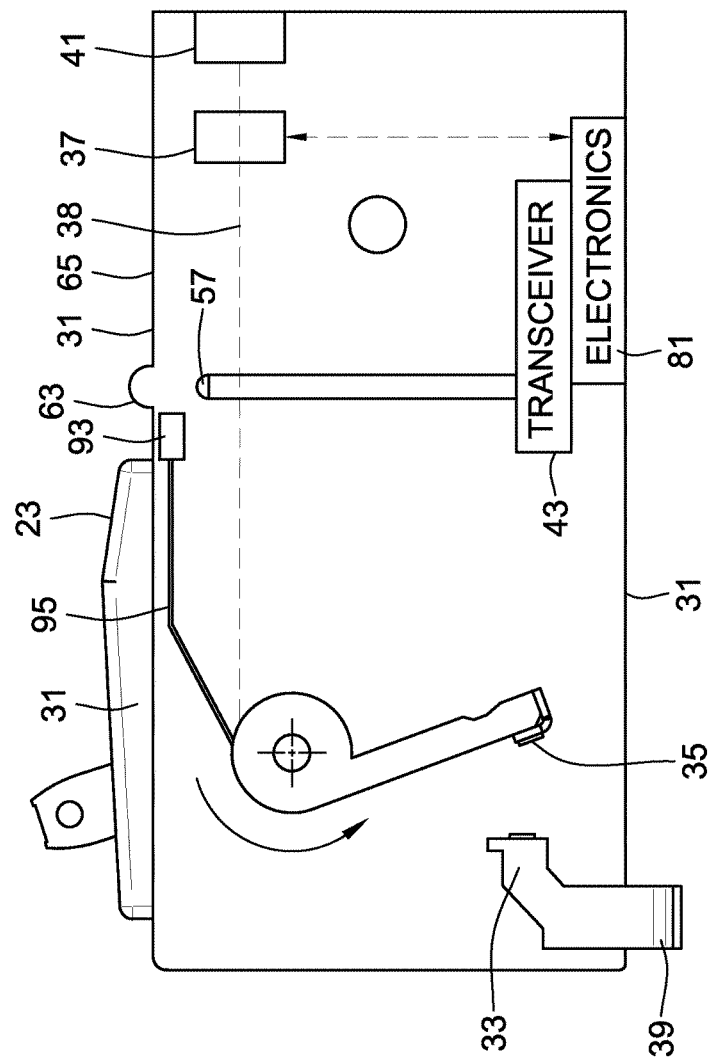
FIG. 4 is a schematic side view illustration of an exemplary optical shunt for an unpowered circuit breaker.

As seen especially in FIG. 4, each electronic circuit breaker 23 has a case 31, separable electrical contacts being a fixed contact 33 and movable contact 35, and sensing/data gathering apparatus 37, such as a current transformer or the like on the current path 38 and associated electronics, between its line side terminal 39 and load side terminal 41, as commonly known in the art. Of particular interest to aspects of the present invention, each exemplary breaker 23 can be equipped with a data transceiver 43. Referencing also FIGS. 2A and 2B, each breaker has left and right side Visible light tubes 57, 59 (one at each side wall) through optical ports 62, 64 which are openings in the circuit breaker case 31. Lenses may be used at the optical ports if necessary or desired. The breaker 23a has left and right side Visible Light Indicator Windows 61, 63 on the circuit breaker top wall (face) 65 in optical communication with the visible light tubes 57, 59. The breaker 23a has left and right side Visible LEDs 67, 69 at the left and right side visible light tubes 57, 59 within the breaker case. The breaker 23a has left and right side bidirectional data lines 71, 73 which in certain aspects of the present invention may be optical "light pipes" for optical communications; and the data transceiver 43 having a data input side for receiving a neighboring Notice of Trip Data signal and a data output side for outputting a self-Notice of Trip Data signal. In the illustrated embodiment the data transceiver comprises left and right side channel Data Transceivers. It will be appreciated that the data transmission to the data transceiver may be by appropriate optical transmission means through the breaker cases at additional aligned optical ports if desired or that other means may be used if appropriate. Each bidirectional data line is connected to the appropriate respective channel of the data transceiver 43. Referencing FIG. 2B, it can be seen that operationally, the subject tripped breaker 75 is located to the left of the neighboring breaker 77 which is untripped, on, and thus fully powered from the line side of the load center 21. The left indicator light tube 79 of the neighboring breaker 77 is aligned with the right indicator light tube 59 of the subject tripped breaker 75 when the breakers are held in their respective slots in the load center.

In the left wall 45 and right wall 47, of the case 31 are located optical ports 62, 64, respectively, for the bidirectional indicator light tubes. The optical ports are placed in fixed positions for allowing optical signals through the case walls and may include lensing if desired. Each optical port leads to a respective light pipe, 57, 59, respectively, with each light pipe contained inside the case 31 and connected to the optical data transceiver 43 or individual operating portion thereof, as hardware and design may dictate. It will be appreciated that, if desired, the front wall 49 might likewise be equipped with communications lines and light tubes as indicated by the directional arrows in FIG. 1. It will be appreciated that a two pole breaker could, for example, have two forward optical ports to communicate with two forward wall neighbors. It is noted that not all panel boards are two column designs and a front optical port and light pipe may not be strictly required in a one column design where the subject breaker lacks a front-neighboring circuit breaker.

The electronics 81 (FIG. 4), or subset thereof, for each breaker 23 are capable of encoding and reporting a Notice of Trip Data signal including fault data to the data transceiver 43. The transceiver of each breaker is capable of both transmitting the Notice of Trip Data signal of the breaker, e.g. through one or more of its bidirectional data lines to an additional optical port, and is capable of receiving and acting as a repeater, repeating the neighboring Notice of Trip Data signals through the data lines and out to neighboring breakers.

Referring particularly to FIG. 4, the breakers are provided with a mechanically operated shutter 93 linked to the movable contact 35 for providing an optical communication path to the visible light indicator windows 63 of the breaker as a result of separating the electrical contacts. When the circuit breaker contacts 33, 35 open due to a trip or being switched off, a mechanical linkage drives the shutter 93 out from under the visible light indicator windows 61, 63 of the circuit breaker 23. This allows the trip indication sent from the neighboring breaker 77, which still has power, to shine through the visible light indicator windows 61, 63 of the unpowered tripped breaker 75.

Figure 3A:
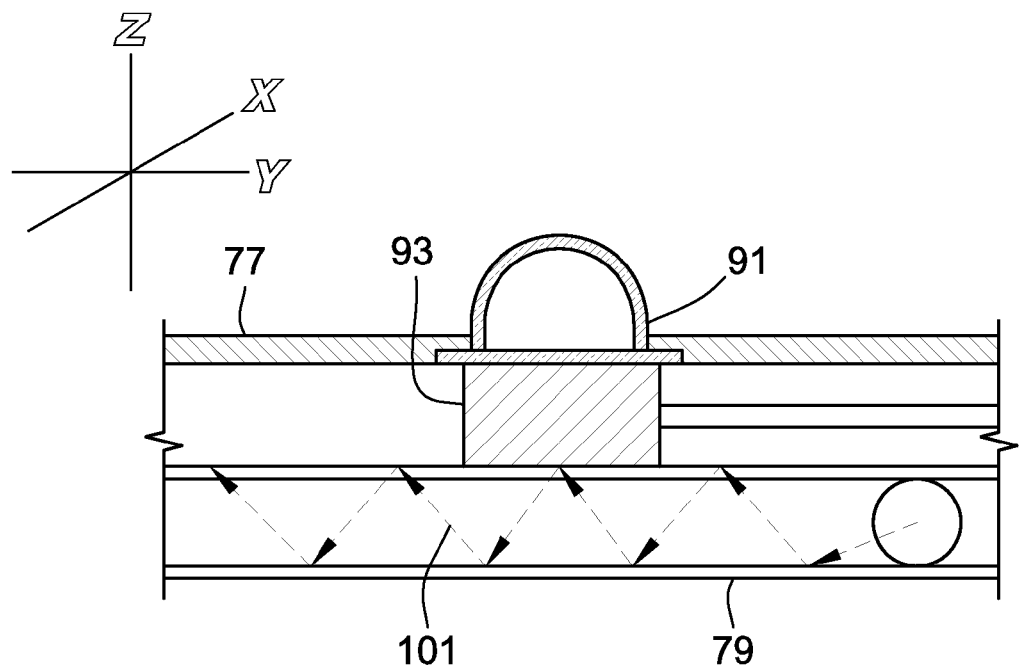
FIG. 3A is a schematic view of the trip indication operation in a powered exemplary circuit breaker.
Figure 3B:
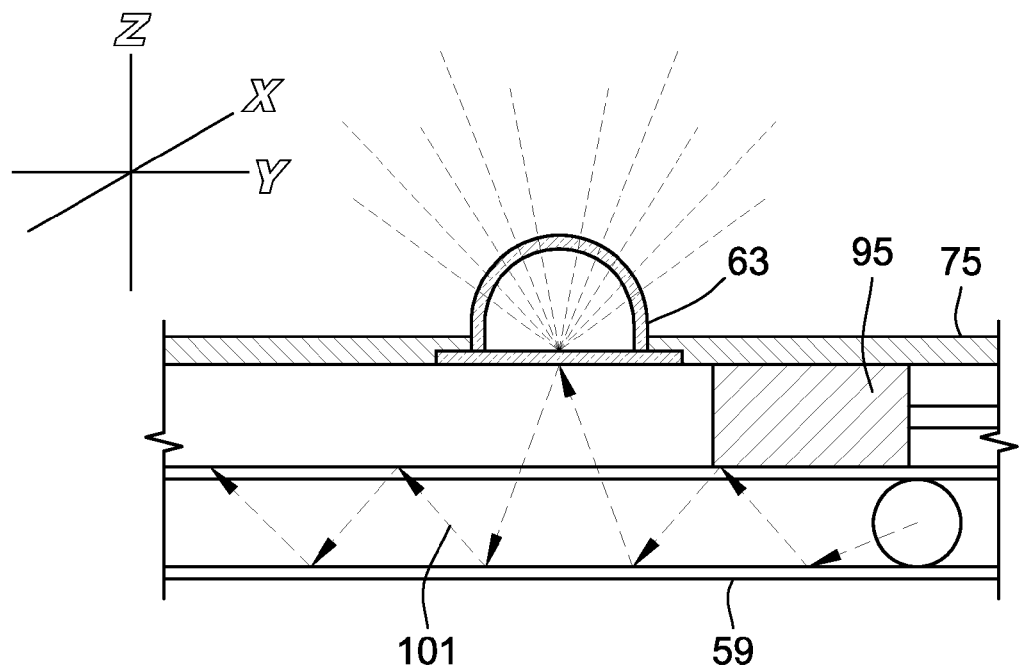
FIG. 3B is a schematic view of the trip indication operation an unpowered exemplary circuit breaker.

In operation aspects of the system of the present invention would work as follows. The subject breaker, i.e. the breaker on the left 75 in FIG. 2B, while monitoring its operations through its electronics 81 (FIG. 4) senses the conditions of an impending trip, or in some aspects of the invention may sense an actual trip signal if equipped with a post-trip power source such as a reserve capacitor or the like. At this point the subject breaker sends a Notice of Trip Data signal, encoding any relevant information such as time of trip, type of fault which caused the trip, etc., out from its data transceiver 43 over its right side data communications line 73 into the left side data communications line 83 of the untripped neighboring breaker 77. The data transceiver 85 of the neighboring breaker 77 encodes and repeats the Notice of Trip Data signal as a trip indication through its left side visible light source 87, which may be an appropriate LED if desired. The trip indication travels from the left side visible light source 87 through the neighboring breaker left side indicator light tube 79. The light 101 (FIGS. 3A and 3B) from the indicator tube 79 does not illuminate the neighboring breaker visible light indicator window 91 because this window is blocked from below by a shutter 93 connected to the movable contact 35 of the neighboring breaker 77, when its electrical contacts are in the closed position, as seen in the detail of FIG. 3A. The shutter might, for example, operate mechanically comparable to known mechanical trip indicators for miniature circuit breakers such as VISI-TRIP™ from Schneider Electric, but in reverse, i.e. withdrawing its flag portion upon a trip rather than advancing it. The trip indication light 101 proceeds to the tripped breaker 75 through aligned optical ports in the breaker cases and into the right side indicator light tube 59 of the tripped breaker. The shutter 95 (FIG. 3B) of the tripped breaker 75 has been withdrawn from beneath the indicator windows 61, 63 of the tripped breaker 75 due to the movement of its movable contact 35 thus allowing the trip indication light to illuminate the right side visible light indicator window 63 of the tripped breaker 75 as shown in the detail of FIG. 3B.

It will be noted that in some aspects of the invention the circuit breaker providing visible indication can provide unique indication for all neighboring circuit breaker if needed. If, for example, both the left and right side neighbors are tripped, the center breaker can provide different indications to each of the tripped circuit breakers. It will also be noted that the indicator window on the face of the circuit breaker is shown as two separate indicator windows for clarity. The separate indicator windows show how the visible light intended for the tripped circuit breaker on the left, for example, is not also sent to the circuit breaker on the right. For aesthetic purposes, this might be made to look like a single window from the outside with a light guiding material that prevents reflection into the opposite indication light tube. It will also be noted that it is possible to use the same light tube for both data and visible light. In this aspect of the invention, the trip data may be visible or invisible (such as Infrared). The tripping breaker can send the trip data by flashing (modulating) it's visible LED. The neighboring breaker receives this data and sends the appropriate visible light indication back to the tripped breaker. It will also be noted that in some aspects of the invention the indication supplied to the tripped circuit breaker can be flashing, not flashing, or flashing in sequence (code). In addition, the indication can be in any visible color. The combination of flashing (or not) and color allows for many possible indication types. In other aspects, the indication can also be modulated in a way that provides visible indication and also allows digital transfer of more detailed information to an external device.

While particular aspects, implementations, and applications of the present disclosure have been illustrated and described, it is to be understood that the present disclosure is not limited to the precise construction and compositions disclosed herein and that various modifications, changes, and variations may be apparent from the foregoing descriptions without departing from the scope of the disclosed embodiments as defined in the appended claims.

The invention claimed is:

1. An electronic circuit breaker with a case, separable electrical contacts, and electronic sensing/data apparatus, having:

a) a data transceiver having a data input side for receiving a neighboring Notice of Trip Data signal and a data output side for outputting a self-Notice of Trip Data signal;
b) a visible light emitter connected to the data transceiver to output the received neighboring Notice of Trip Data signal as a trip indication comprising visible light;
c) electronics for encoding and reporting a Notice of Trip Data signal to the data transceiver;
d) visible light indicator windows on a top wall of the breaker case;
e) a shutter for the visible light indicator windows, the shutter capable of blocking the visible light indicator windows when the trip indication comprising visible light is output from inside the breaker, and unblocking the visible light indicator windows when the breaker is tripped;
f) left and right side indicator light tubes, each light tube being capable of receiving a trip indication comprising visible light from a neighboring breaker;
g) left and right side light ports in the case, each light port being a light passage through the breaker case leading to a respective one of the indicator light tubes,
h) left and right side data lines for transmitting the Notice of Trip Data signal from the transceiver; and
i) each data line being connected to the data transceiver.

2. The electronic breaker according to claim 1 wherein the left and right side data lines are light pipes for optical signals.

3. The electronic breaker according to claim 1 wherein the left and right side data lines are bidirectional.

4. The electronic breaker according to claim 3 wherein the left and right side bidirectional data lines can receive a Notice of Trip Data signal from a neighboring breaker and transmit the Notice of Trip Data signal from the transceiver of the electronic breaker.

5. The electronic breaker according to claim 1 wherein the Notice of Trip Data signal includes a type of fault causing the trip.

6. The electronic breaker according to claim 1 wherein the left and right side indicator light tubes are bidirectional.

7. The electronic breaker according to claim 6 wherein each bidirectional light tube is capable of receiving a trip indication comprising visible light from a neighboring breaker and transmitting the trip indication comprising visible light from inside the breaker.

8. The electronic breaker according to claim 1 wherein the transceiver further includes a driver for the light emitter.

9. The electronic breaker according to claim 1 wherein the light emitter is an LED.

10. The electronic breaker according to claim 1 wherein the shutter is mechanical.

11. A load center comprising:

a plurality of electronic circuit breakers, each breaker being placed in alignment with an adjacent breaker of the plurality of breakers and each breaker having:
a data transceiver having a data input side for receiving a neighboring Notice of Trip Data signal and a data output side for outputting a self-Notice of Trip Data signal;
a visible light emitter connected to the data transceiver to output the received neighboring Notice of Trip Data signal as a trip indication comprising visible light;
electronics for encoding and reporting a Notice of Trip Data signal to the data transceiver;

visible light indicator windows on a top wall of the breaker case;

a shutter for the visible light indicator windows, the shutter capable of blocking the visible light indicator windows when the trip indication comprising visible light is output from inside the breaker, and unblocking the visible light indicator windows when the breaker is tripped;

left and right side indicator light tubes, each light tube being capable of receiving a trip indication comprising visible light from a neighboring breaker;

left and right side light ports in the case, each light port being a light passage through the breaker case leading to a respective indicator light tube, left and right side data lines for transmitting the Notice of Trip Data signal from the transceiver; and each data line being connected to the data transceiver; and having at least two of the circuit breakers comprising first and second circuit breakers, respectively, placed side by side with aligned optical ports, wherein the transceiver of the first circuit breaker receives the neighboring Notice of Trip Data signal from the second circuit breaker on one of the data lines and transmits the neighboring Notice of Trip Data signal via visible LEDs through the indicator light tube(s) and the aligned optical ports.

12. The load center of claim 11 wherein the data lines are bidirectional for receiving the neighboring Notice of Trip Data signal and for transmitting the Notice of Trip Data signal from the transceiver.

13. The load center of claim 11 wherein the light tubes are bidirectional to enable a breaker to receive its own Notice of Trip Data signal as a visible light indication from a neighboring breaker and to transmit a neighbor's trip indication back to the neighbor.

14. An electronic circuit breaker with a case, separable electrical contacts, and electronic sensing/data apparatus, having:

an optical data transceiver having a data input side for receiving a neighboring Notice of Trip Data signal and a data output side for outputting a self-Notice of Trip Data signal;

a visible light LED connected to the data transceiver to output the received neighboring Notice of Trip Data signal as a trip indication comprising visible light;

electronics for encoding and reporting the self-Notice of Trip Data signal to the data transceiver;

visible light indicator windows on a top wall of the breaker case;

a shutter for the visible light indicator windows, the shutter capable of blocking the visible light indicator windows when the trip indication comprising visible light is output from inside the breaker, and unblocking the visible light indicator windows when the breaker is tripped;

left and right side bidirectional indicator light tubes, each bidirectional light tube being capable of receiving and displaying a trip indication comprising visible light from a neighboring breaker when the shutter is open and for transmitting and not displaying the trip indication comprising the visible light from inside the breaker when the shutter is closed;

left and right side light ports in the case, each light port being a light passage through the breaker case leading to the respective indicator light tubes, left and right side data lines for receiving the neighboring Notice of Trip Data signal indicating a neighboring breaker's trip and for transmitting the self-Notice of Trip Data signal indicating the breaker's own trip data to a neighboring breaker; and each bidirectional data line being connected to the data transceiver.

15. The electronic circuit breaker of claim 14 further comprising a front wall bidirectional light tube and a front wall bidirectional data line.

* * * * *